United States Patent [19]

Givens

[11] Patent Number: 4,787,614

[45] Date of Patent: Nov. 29, 1988

[54] WORKHOLDER FOR MACHINE TOOLS

[76] Inventor: Morris C. Givens, 12618 NE. 72nd, Kirkland, Wash. 98033

[21] Appl. No.: 793,570

[22] Filed: Oct. 31, 1985

[51] Int. Cl.[4] .................................................. B23Q 3/00

[52] U.S. Cl. ...................................... 269/303; 269/304; 269/315

[58] Field of Search .................... 269/303, 289 R, 291, 269/292, 304, 315

[56] References Cited

U.S. PATENT DOCUMENTS

| | | | |
|---|---|---|---|
| 1,023,407 | 4/1912 | Albrecht | 269/303 |
| 2,285,897 | 6/1942 | Campbell | 269/303 |

*Primary Examiner*—Frederick R. Schmidt
*Assistant Examiner*—Judy J. Hartman
*Attorney, Agent, or Firm*—Dowrey, Cross & Cole

[57] ABSTRACT

A work-piece holder for use with work table mounted machine tools. The work table includes a work guide or guard which controls the depth of cut of the machine tool. The work holder includes an elongated frame and is provided with laterally operating jaw type clamps member for clamping the work-piece in fixed position on the frame with the work-piece in sliding contact with the table surface. One side of the frame provides a guide follower surface for contacting the work guide and the clamp member is recessed from the follower surface to permit removal of material from the work-piece when the frame is moved along the guide. For angle end cutting of work-pieces which extend beyond the follower surface, a guide arm is clamped to the frame at an angle to accomodate the end cut on the work-piece. The guide arm includes follower surfaces which are moved along the guide to bring the work-piece into cutting contact with the cutter.

6 Claims, 2 Drawing Sheets

WORKHOLDER FOR MACHINE TOOLS

BACKGROUND OF THE INVENTION

1. Field of the Invention

The present invention relates to work-piece holders for various well known types of table mounted machine tools such as routers, cutters, shapers and the like. The work-piece holder is of the type that may be positioned on a work table and operated with standard work-piece guides mounted adjacent the machine tool. The work-piece holder secures the work-piece against slippage during forward and return strokes regardless of the angle of cutting and is guided by the standard machine tool guide or fence. The need for hand contact of the work-piece during operation and contact between the work-piece and the machine tool guides or fences is thus eliminated.

2. The Prior Art

Table top mounted machine tools for such operations as routing, cutting and shaping have been well known in the art for many years and are commercially available in many forms, both for home and professional use. Although woodworking tools are most common, these tools are suitable for use with plastics, metal or any other machinable material. These tools are also usually provided with adjustable guides or "fences" which may be independently set so as to allow the work-piece to be moved past the cutting tool for removal of material at the proper angle and position for a predetermined cut. Examples of table mounted machine tools with adjustable fences or guide elements are contained in the H. E. Tautz U.S. Pat. Nos. 1,947,885 and 2,085,235 and the F. L. Forster U.S. Pat. No. 727,337.

Although prior art work-piece holders have been devised for securely holding the work-piece while it is guided past the tool with the aim of maintaining the operator's hands clear of the high speed cutting tool, many problems have been encountered. Prior art work holders have normally been complicated in structure or of special design requiring specialized work tables or modification of existing table structures. Even the most sophisticated and adaptable devices have serious limitations as to the size of work-piece which can be accommodated. Extremely small blocks in the order of less than one inch dimensions may be impossible to handle and/or the angle of cut may be severely restricted. Additionally the danger of operator injury increases with the handling of extremely small blocks. The two H. E. Tautz U.S. Patents cited above are examples of such limited work-piece holders. Additional examples of work-piece holders for table top mounted machine tools are contained in the A. L. Stoddard U.S. Pat. No. 604,946 and the L. M. Budd U.S. Pat. No. 2,668,568.

SUMMARY OF THE INVENTION

The present invention provides a work-piece holder which requires no modification to standard commercially available work tables for its safety or accuracy and which requires no hand contact with the work-piece during the cutting operation. The work-piece holder rests directly on the work table and contacts the standard adjustable fence apparatus for guiding the work-piece with extreme accuracy. The structure of the work-piece holder is extremely simplified yet sturdy and capable of holding the work-piece against slippage at any angle and against any difficult cutting such as with dense materials and end grain cutting. Theses advantages are gained while having the capability of cutting work-piece blocks of extremely small dimensions. The novel work-piece clamping structure of the device allows routing end grain wood as small as one quarter inch in width and allows routing on all sides of a block in the order of three quarter inch square at any angle. All of these advantages are obtained with the present invention while keeping manufacturing costs of the holder at a competitive level so as to be available to individual home users as well as professionals.

BRIEF DESCRIPTION OF THE DRAWINGS

Reference is made to the accompanying drawings illustrating preferred embodiments of the invention wherein.

DESCRIPTION OF THE PREFERRED EMBODIMENTS

Figure 1:
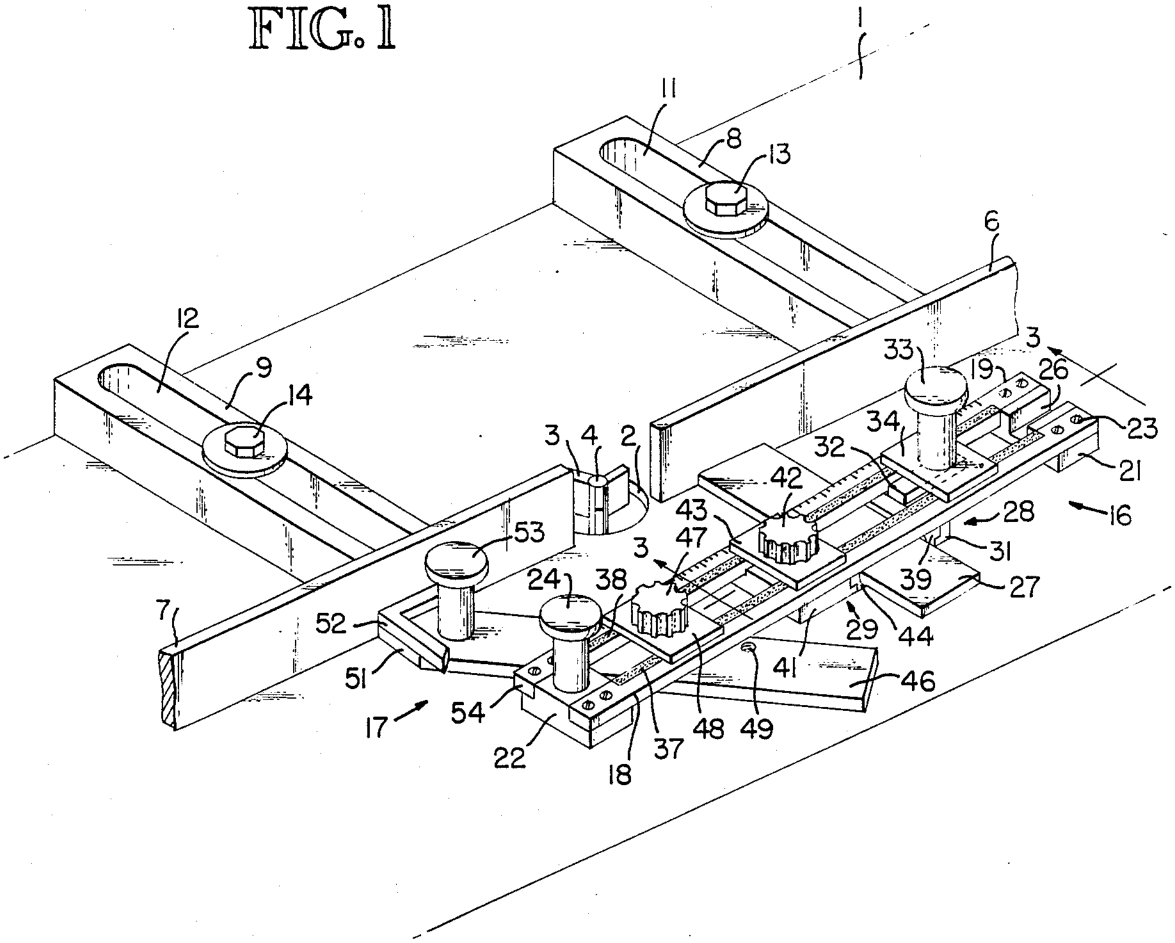
FIG. 1 is a perspective view of one embodiment of the work-piece holder in position for angle cutting on a table mounted machine tool.
Figure 2:
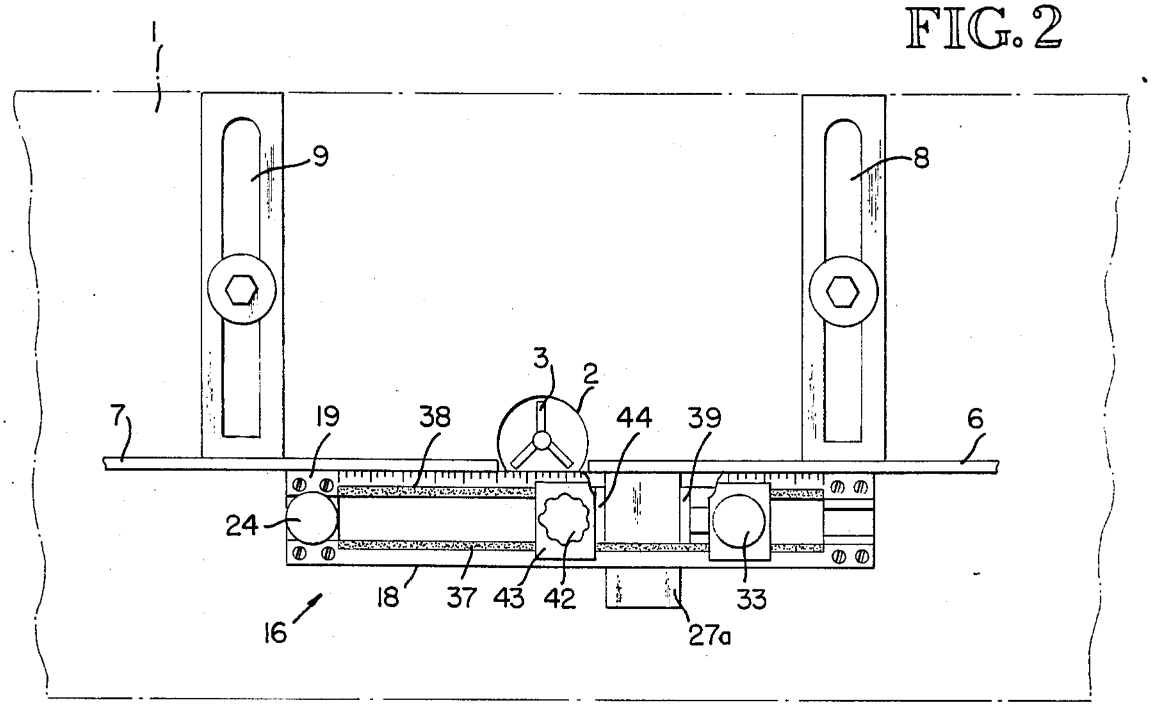
FIG. 2 is a top plan view of the FIG. 1 embodiment with the work-piece clamping arm in position directly against the tool fence for straight cutting.

FIG. 1 illustrates a conventional or standard machine tool work table 1 having a flat horizontal table top surface with a cutter opening 2. The machine tool is illustrated as a router bit 3 carried by a power driven spindle 4 extending vertically through the opening 2. The tool 3 is flanked by the individually adjustable guard and guide fences 6 and 7 which extend upright from the table surface. The fences 6 and 7 are connected to the slotted arms 8 and 9 respectively which are slidably supported on the table surface. The arms 8 and 9 are provided with longitudinal slots 11 and 12 respectively for engaging the clamp bolts 13 and 14 which clamp the arms 8 and 9 in preselected positions on the table surface in a well-known manner. The fences 6 and 7 are thus individually positionable so as to be either laterally offset or aligned as shown in FIGS. 1 and 2. The offsetting of the fences is a common expedient and allows for the depth of cut and removal of material from on the work-piece as it is fed past the cutter or router bit 3.

The work holder of the embodiment of the invention shown in FIG. 1 includes a work-piece holding frame indicated generally at 16 and a guide follower arm 17 connected thereto. As will be presently understood, the work holding frame and the guide follower arm are used in combination to make angled end cuts, however, the work holding arm is usable without the guide follower arm for making straight cuts in direct cooperation with the guides or fences 6 and 7. Referring again to FIG. 1, the work holding frame 16 includes parallel side rails 18 and 19 connected together at their adjacent ends by means of the crossbars 21 and 22 so as to be in rigid alignment. The rails and the crossbars may be made of lightweight metal or wood and secured together by means such as the fastening screws 23 or any other means of rigid connection. The crossbars 21 and 22 may be formed with an overall "T" configuration providing for transverse supporting blocks beneath each end of the parallel rails. The bottom surfaces of the crossbars slideably rest on the table top 1. In this manner, the rails are held elevated from the table surface. The central portion of the cross bar 22 extending between the two side rails is provided with an upstanding handle 24 for a purpose presently to be described and the crossbar 21 is notched as at 26 to accommodate the extreme end position of the work-piece clamp to be described.

Figure 3:
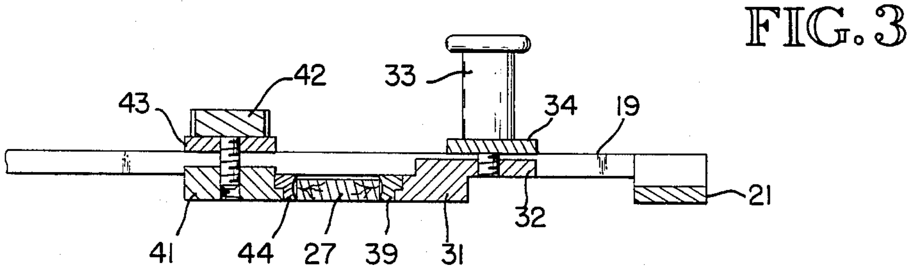
FIG. 3 is a cross-sectional view taken along lines 3—3 of FIG. 1.

The work-piece 27 in FIG. 1 is clamped rigidly to the work holding frame 16 by means of the movable clamps indicated generally at 28 and 29. In the FIGS. 1 to 3 embodiment, both clamping mechanisms 28 and 29 are movable along the length of the rails and may be clamped in any preselected position. The clamping mechanism 28 includes a lower work-piece holding jaw 31 and a longitudinally extending upper projection 32 which extends between the rails 18 and 19 for the purpose of providing a screw threaded connection for the handle 33. As illustrated in FIG. 3, the handle 33 is seated against the crossplate 34 and includes a screw threaded lower end for engaging the projection 32 to clamp the jaw 31 in fixed position on the rails. In order to insure a non-slip engagement between the crossplate 34 and rails, the inside edges of the rails may be provided with knurled or roughened surface areas 37 and 38 to enhance the frictional engagement therebetween. As previously mentioned, the end crossbar 21 is slotted at 26 in order to receive the projection 32 when the clamp 28 is moved to the extreme right hand end position as viewed in FIG. 1. The clamping jaw 31 may also be provided with a work contacting insert 39 contoured to conform to the edge of the work-piece. These inserts are removable and may be of any configuration or made of any material compatible with the edge of the work-piece involved.

The clamping mechanism 29 includes a lower jaw 41 which contacts the undersides of the rails 18 and 19 and is clamped in a preselected position along the rails by means of the screw threaded knob 42 and the crossplate 43 as shown in FIG. 3. The jaw 41 may also include the work-piece contacting insert 44 constructed from a suitable material and contoured to contact the edge of the work-piece 27 without damage thereto. With this arrangement, it will be understood that various sizes of work-piece 27 may be accommodated and securely clamped in position at any location along the length of the rails 18 and 19 as desired. As illustrated in FIG. 1, one or both of the rails 18 or 19 may be provided with calibrations along its outside edge to aid in accurately positioning the clamping jaws as desired. The bottom surfaces of the jaws 31 and 41 slidably rest on the top surface of the worktable 1 and hold the work-piece 27 in rigid relationship with the side rails with the bottom surface thereof also resting on the table top.

When shaping the angled end of a work-piece as shown in FIG. 1, the guide follower arm 17 is employed with the work holding frame 16. The guide follower arm 17 includes the arm 46 which is clamped to the rails 18 and 19 of the work holding frame by means of a screw threaded knob 47 and the crossplate 48. The arm 46 may be provided with several screw threaded holes such as the hole 49 for positioning the work holding frame at various locations along the length of the arm. The ends of the follower arm 46 may be angled as at 51 such that the angled faces are at 90° for locating the follower arm 46 at a 45° angle relative to the fences. Each face 51 may be provided with and extended guide follower member 52 to increase the surface contact between the end of the follower arm 46 and the fence for stability and accuracy. An upwardly projecting handle 53 is connected to the end of the arm 46 adjacent the follower members 52.

In setting up the apparatus for shaping the angled end of a work-piece 27 in mode illustrated in FIG. 1, it will be understood that the fences 6 and 7 are initially aligned and set for the desired width and depth of cut to be made. The work-piece 27 is, of course, initially angle cut or mitered on the end at a predetermined angle. The work piece is then located between the jaws 31 and 41 and the jaws moved tightly against the work-piece and clamped to the rails 18 and 19. In this manner the work-piece holding frame may be maintained the desired distance from the fences 6 and 7 and disposed at an angle thereto so as to accommodate the angled end cut on the work-piece 27. In this set up procedure the guide follower surfaces 51 and 52 are brought into face contact with the fence 7 and the arm 46 clamped to the holder 16 by means of the screw threader knob 48 as previously described. The device is now ready for cutting by grasping the handles 33 and 53 and moving the work-piece past the cutter.

FIG. 2 illustrates the use of the work holding frame in making straight or right angle end cuts. As will be noted in FIG. 1, the end crossbars 21 and 22 do not extend the full width of the rail 18 leaving an overhang 54 on the rail projecting beyond the outside face of the cross bars. Likewise the side faces of the jaws 31 and 41 terminate short of the outside edge of the rail 18 to maintain the projecting edge of the rail clear the entire length of the rail. The work-piece 27*a* is chucked between the jaws 31 and 41 with the edge to be cut being flush with the outside surface of the rail 18. The fences 6 and 7 are then set for the desired width and depth of cut which must be within the profile of the area beneath the rail overhang 54. With this set up the work holder frame is positioned with the rail 18 bearing directly against the aligned fences 6 and 7 and moved therealong by means of the handles 33 and 24, to perform the cutting operation on the work-piece. Hand contact with the work-piece during cutting is thus completely avoided and no reliance upon contact between the work-piece and the fences is necessary. This arrangement permits cutting on all four sides of an extremely small dimensioned block with complete safety.

Figure 4:
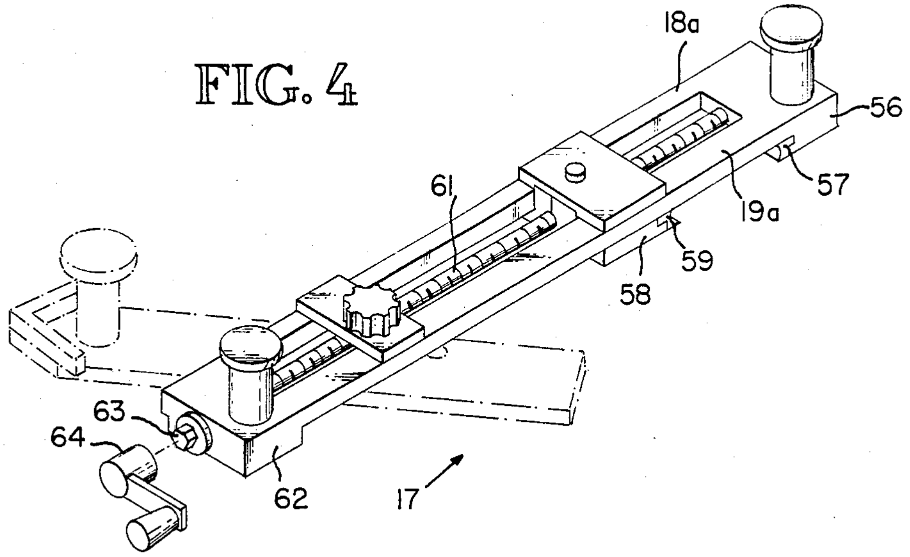
FIG. 4 is a perspective view of a second embodiment of the work-piece clamping arm.

FIG. 4 illustrates a second embodiment of the invention which may be identical in all respects to the FIGS. 1–3 embodiment except for the arrangement of work-piece clamping jaws. As seen in FIG. 4, the end cross bar 56 is utilized as a stationary clamping mechanism with a jaw insert 57 as previously described. The mating clamping mechanism 58 is movable along the rails 18*a* and 19*a* and is provided with a jaw insert 59. A screw threaded shaft 61 extends through a bore in the cross bar 62 and has its opposite end mounted for rotation in the upper portion of the cross bar 56 above the jaw 57. The shaft 61 extends through a screw threaded bore in the clamping mechanism 58 and is provided with a crank fitting 63 protruding from the cross bar 62. A mating crank 64 may be applied to the fitting 63 for the purpose of rotating the screw threaded shaft to advance or retract the clamp 58. With this arrangement it will be appreciated that a work piece may be placed between the jaws 57 and 59 and clamped therebetween by rotation of the shaft 61 providing a tight grip on this work piece regardless of its size. The clamping mechanism 58 may be constructed with separating segments and provided with any well known releasing means for quick release of the segments from the shaft 61 to release the work piece as desired without departing from the scope of the present invention.

Although the present invention has been described and illustrated with respect to two specific embodiments thereof, it will be apparent to those skilled in the art that modifications to the structures described may be made without departing from the spirit of the invention or from the scope of the appended claims.

What is claimed is:

1. A work holder for use with a machine tool, of the type which includes; a work table having a generally horizontal planar table surface, a power driven cutter means extending vertically through the table surface and projecting a given elevation above the table surface, and an upstanding guide means disposed at right angles to the table surface, wherein the guide means is adjustable relative to said machine tool with an elongated guide surface means thereon, said work holder comprising;

an elongated work holding frame having a bottom surface means for slidably supporting said frame on the table surface, said frame also including a follower surface for contacting the guide surface of a machine tool when in use to be guided therealong, work-piece clamping means mounted on said frame for clamping a work-piece to said frame so that the work piece will contact the table surface and an end surface of the work-piece is substantially flush with the follower surface, said clamping means including for directing lateral clamping forces against a work-piece in use, and wherein said clamping forces are directed substantially parallel to said bottom surface means, said follower surface being located along the longitudinal length of said frame on a side edge thereof and spaced a sufficient distance higher than said bottom surface means to define a recess means under said follower surface for a cutter of a machine tool when in use therewith, to limit a cut depth within said recess means and said clamping means having an edge surface spaced inward from said follower surface so as not to extend into said recess means, whereby when said work holder is in use with a machine tool, said frame may be slidably moved on a table surface and along a guide surface of the machine tool with said follower in contact with the guide surface and a work-piece may be held by said clamping means such that when said frame is slidably moved the work-piece comes into cutting contact with a cutter without interference between the cutter, said work holding frame and said clamping means.

2. The work holder according to claim 1 wherein said work holding frame comprises;

first and second laterally spaced elongated rails, one of said rails providing said follower surface, connector means rigidly connecting the ends of said rails and comprising said bottom surface means for slidably supporting said rails above the level of said table surface, said clamping means being located beneath said rails and at least one of said clamping means being movable along the length of said rails, and means to position said at least one clamping means in preselected fixed position along said rails.

3. The work holder according to claim 2 wherein said means to position said at least one clamping means comprises;

screw threaded shaft means extending parallel to said rails and operatively associated with said connector means for rotation therein, said shaft being threadably engaged with said at least one clamping means for advancing and retracting said clamping means along said rails.

4. The work holder of claim 3 including spaced handle means carried by said frame whereby an operator may grasp the frame and move it along the guide means without hand contact with the work-piece.

5. The work holder according to claims 1, 2, 3 or 4 including;

a guide follower arm including guide contact surfaces on one end thereof adapted to engage said guide, and means to releasably clamp said arm to said frame at a predetermined angle, whereby said frame may be spaced from said guide and at a predetermined angle thereto so as to accommodate a precut angle on the end of a work-piece extending beyond said follower surface.

6. A work-piece holder for use with a work table mounted machine tool cutter wherein a cutter extends a given elevation above the surface of the table and includes an upstanding guide means disposed at right angles to the table surface wherein the guide means is adjustable relative to the machine tool with an elongated guide surface thereon, said work-piece holder comprising;

an elongated work-piece holding frame having a bottom surface means for slidably supporting said frame on the work table surface, and an end surface of the work-piece is substantially flush with the guide follower surface, said frame having a guide follower surface on one side thereof for contacting the guide surface of a machine tool when in use to be guided thereby, work-piece clamping means mounted on said frame for clamping a work-piece to said frame so that the work-piece will contact the table surface, said guide follower surface being located along the longitudinal length of said frame on a side edge thereof and spaced a sufficient distance higher than said bottom surface means to define a recess means under said guide follower surface for a cutter of a machine tool when in use therewith, to limit a cut depth within said recess means and said clamping means having an edge surface spaced inward from said follower surface so as not to extend into said recess means, whereby when said work-piece holder is in use with a machine tool said frame may be moved on a table surface and along a guide surface of the machine tool with said follower surface in contact with the guide surface and a work-piece may be held by said clamping means such that when said frame is slidably moved the work-piece comes into cutting contact with a cutter without interference between the cutter and said frame and said clamping means.

* * * * *

UNITED STATES PATENT AND TRADEMARK OFFICE
CERTIFICATE OF CORRECTION

PATENT NO. : 4,787,614

DATED : November 29, 1988

INVENTOR(S) : Morris C. Givens

It is certified that error appears in the above-identified patent and that said Letters Patent is hereby corrected as shown below:

Column 5, line 31, Claim 1, insert --means--before "for".

Signed and Sealed this

Fourth Day of April, 1989

*Attest:*

DONALD J. QUIGG

*Attesting Officer*

*Commissioner of Patents and Trademarks*